United States Patent Office 2,772,780
Patented Dec. 4, 1956

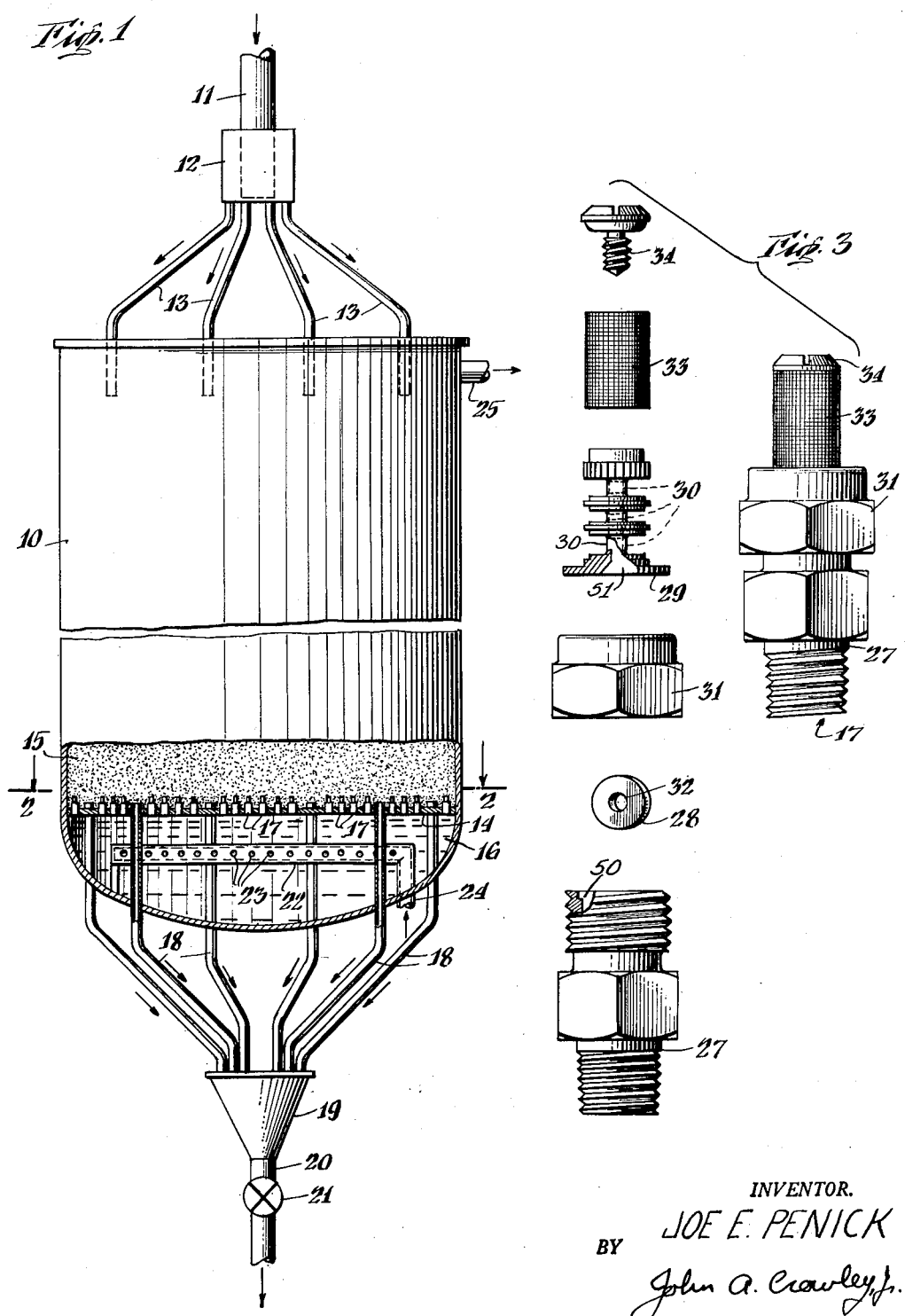

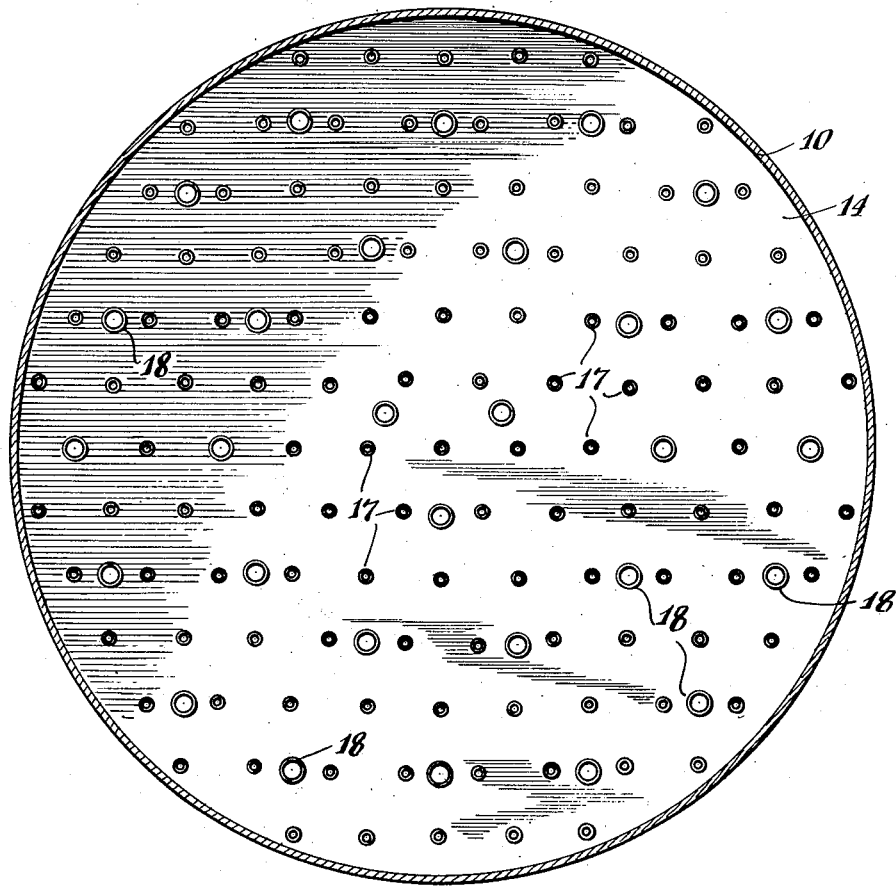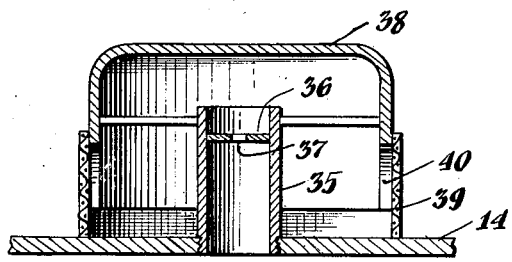

2,772,780

APPARATUS FOR CONTACTING LIQUIDS WITH GRANULAR SOLID MATERIALS

Joe E. Penick, Woodbury, N. J., assignor to Socony Mobil Oil Company, Inc., a corporation of New York Application July 17, 1951, Serial No. 237,265

7 Claims. (Cl. 210—42.5)

This invention has to do with an apparatus for the contacting of liquid and granular solids in a closed vessel and particularly with an apparatus for the introduction of liquid into a closed vessel containing a bed of granular solids. Typical of the processes to which this invention applies is the continuous percolation of liquid hydrocarbon oils upwardly through a downwardly moving bed of an adsorbent of palpable particulate form to effect the decolorization or neutralization of the oil or the removal of dissolved or suspended matter from the oil. This invention is concerned particularly with an apparatus for introducing liquid oil into the treating zone of such processes.

It has been found that in order to attain proper decolorization of the oil and efficient utilization of the adsorbent in the treater of processes of the continuous percolation type, a true uniform countercurrent contacting of the oil and adsorbent must be maintained throughout the treating zone. This means that difficulties such as channeling of the oil or adsorbent through the adsorbent bed, and localized disturbances and disruption of the bed must be avoided. It has been found that in treaters of commercial size, which may range upwards from 2 feet in diameter, the manner in which liquid oil is introduced into the adsorbent bed has a very pronounced effect upon the creation and accentuation of the above-mentioned difficulties.

A major object of this invention is to provide an apparatus for contacting liquid and granular solids which overcomes the above-described difficulties.

A specific object of this invention is to provide a nozzle for introducing liquid into a vessel containing a bed of granular solid which avoids the channeling of the liquid through the bed of solids.

This invention describes an apparatus for contacting liquid and solids in which liquid from a nozzle body is directed against a deflecting baffle a spaced distance away from the nozzle body to disperse the liquid. A cylindrical screen encloses the space between the body and the baffle to prevent plugging of the nozzle by granular solids. A flow restriction is provided within the nozzle body so that when a plurality of nozzles are used within a single vessel the flow through all of the nozzles will be substantially the same.

This invention is best understood by referring to the attached drawings, of which Figure 1 is an elevational view, partially in section, showing the application of this invention to a process for the continuous percolation of liquid hydrocarbon oils through a moving bed of granular adsorbent;

Figure 2 is a sectional view taken along line 2—2 of Figure 1;

Figure 3 is a drawing of the assembled apparatus of this invention and its various parts;

Figure 4 is an elevational view, in section, showing a modification of this invention.

All of these drawings are diagrammatic in form.

Referring first to Figure 1, there is illustrated thereon an apparatus for the continuous percolation of hydrocarbon oils through a bed of granular adsorbent. This process is described in detail in Evans et al., United States patent application, Serial Number 177,408, filed August 3, 1950, now Patent No. 2,701,786. In Figure 1 there is shown an enclosed vessel 10. A contact material feed conduit 11 terminates within a distributor 12 which acts to distribute the granular material across the upper section of vessel 10 by means of conduits 13. A suitable distributor is described in Penick, United States patent application, Serial Number 237,264, filed July 17, 1951. A transverse partition 14 extends across the lower section of vessel 10 so as to divide the vessel into a contacting chamber 15 above the partition and a liquid hydrocarbon oil plenum chamber 16 therebelow. A plurality of nozzles 17 of the type described hereinbelow are removably attached to the partition and terminate on their upwardly pointing ends within the lower section of contacting chamber 15. A pluraliy of contact material drawoff conduits 18 extend from the lower section of contacting chamber 15 through partition 14 and plenum chamber 16 to the exterior of vessel 10 and terminate within funnel-shaped receptacle 19. A drawoff conduit 20 with valve 21 extends downwardly from the lower section of receptacle 19 so that the granular adsorbent may be removed from the receptacle. A liquid hydrocarbon distributor 22 is fixed within plenum chamber 16. Distributor 22 has a plurality of orifices 23 spaced along its length. A conduit 24, for the supply of liquid, passes into plenum chamber 16 from the exterior of vessel 10 and connects into distributor 22. A liquid drawoff conduit 25 is provided at the upper end of contacting chamber 15.

In operation, granular adsorbent is fed to conduit 11 and gravitates into distributor 12 from which the adsorbent passes by means of conduits 13 into the upper section of contacting chamber 15 within vessel 10. The granular adsorbent passes through chamber 15 as a downwardly moving bed at a rate controlled by valve 21. Liquid hydrocarbon oil is fed to distributor 22 by means of conduit 24. The oil passes through orifices 23 into plenum chamber 16. Oil completely fills the plenum chamber and passes into contacting chamber 15 by means of nozzles 17. Oil passes upwardly through the downwardly moving bed of granular adsorbent and the undesirable constituents are removed from the oil by the adsorbent. Refined oil is removed from the contacting chamber by means of conduit 25. The used adsorbent passes downwardly through conduits 18 into receptacle 19 from which it is removed by means of conduit 20. The used adsorbent may then be freed of occluded oil and reconditioned for reuse by some suitable process such as washing, drying and burning off the impurities in a kiln. The reconditioned adsorbent may then be charged to conduit 11. Alternatively, the used adsorbent may be discarded and fresh adsorbent continually supplied to conduit 11.

Adsorbents which may be employed in this process include fuller's earth, bauxite, bentonite, bone char, charcoal, magnesium silicate, heat and acid treated kaolin and activated carbon. The adsorbent should be of a size within the range about 4–100 mesh and preferably about 10–60 mesh and still more preferably about 15–30 mesh by Tyler Standard Screen Analysis. The adsorbent particles should be of palpable particulate form as distinguished from finely divided powders and may take the form of pellets, capsules, pills, spheres or the like or granules of irregular shape. The term "granular" as used herein in describing and claiming this invention should be understood to include all of these.

Referring now to Figure 2, there is shown thereon the spacing of nozzles 17 and adsorbent drawoff pipes 18. The spacing of nozzles 17 is a critical factor in this process since the efficiency of contact of the liquid oil and adsorbent drops off rapidly as the number of oil inlets 17 is decreased for a given vessel cross-section. The horizontal cross-sectional area of the contacting chamber served by one nozzle should be less than that determined from the equation $A = 1.49\ L^{1.97}$ and greater than $$A = 0.268\ L^{1.20}$$

where $A$ = horizontal cross-sectional area (sq. in.) per nozzle and $L$ = the height (feet) of the bed of granular adsorbent. Preferably the area per nozzle should be $A = 1.21\ L^{1.60}$.

Figure 3 illustrates the component parts of the nozzle of this invention. The body 27 of the nozzle is in the form of a conduit or short nipple threaded at both ends or a connector similar to those used for compression tube fittings. An orifice plate 28 with orifice 32 centrally therein extends transversely across the upper section of conduit 27. A shoulder 50 is provided within the upper section of nipple 27 on which orifice plate 28 rests. A diffuser or baffle supporting member 29 in the shape of an upright cylindrical conduit with a flange attached to its lower end, rests on its lower, flanged end on orifice plate 28 and extends upwardly to a vertical level above the upper end of body 27. The flange on the lower end of conduit 29 is of such a size that it fits within body 27. Passage 51 extends vertically upwardly entirely through member 29. A plurality of apertures or openings 30 are spaced apart along the length and around the circumference of diffuser 29 and connect into passage 51. The total area of these openings should be greater than the area of the orifice 32 within orifice plate 28. A cap or nut 31 is screwed onto the upper section of body 27 so as to hold orifice plate 28 and diffuser 29 in place. A cylindrical screen 33 fits around diffuser 29 and extends over the entire length of the diffuser so as to cover apertures 30. Screen 33 should have a mesh size less than the mesh size of the granular material within the contacting chamber. The mesh size of the screen, however, should not be so small that it furnishes a restriction to liquid flow. The liquid flow restriction should be orifice 32. A deflecting baffle 34 in the form of a screw is fitted into the upper end of diffuser 29 so as to close off the end of the diffuser. Screw 34 also acts to hold screen 33 in place.

In operation, liquid enters the body 27 of the nozzle and passes through orifice 32 and passage 51 and impinges on baffle 34. Baffle 34 acts to spread out the liquid stream which then passes outwardly through openings 30 in diffuser 29 and through screen 33.

Figure 4 illustrates a second form which the apparatus of this invention may take and like parts in Figure 4 and the preceding figures bear the same numerals. The form of the apparatus of Figure 4 is that of a simple bubble cap with screening attached to the outside. The riser 35 acts as the body of the nozzle. An orifice plate 36 with orifice 37 therethrough extends laterally across the riser. The cap 38 acts as a deflecting baffle. Screening 39 of less mesh size than that of the granular solid extends around the cap 38 so as to cover slots 40 and the area beneath the cap. Screen 39 is not attached to plate 14. Riser 35 is threaded over its lower section and fits into threads within the hole in plate 14 so that the entire assembly may be removed at any time. The operation of the apparatus of Figure 4 is about the same as that of Figure 3, oil passing upwardly through riser 35 and orifice 37 and impinging on cap 38. Oil then passes outwardly through slots 40 and under cap 38 and then through screen 39 into the treating vessel.

The pressure drop across orifice 32 or orifice 37 should be at least 4 times and preferably 10 times the velocity head of the oil flowing to the orifice plus at least ¼ and preferably at least equal to the frictional resistance to flow through the bed of granular material thereabove. This frictional resistance is equal to the pressure drop across the bed of granular solids within the contacting zone less the hydrostatic head of liquid in the contacting zone. When the orifices are sized within these limits, the sum of the areas of all the orifices will generally be less than 5 percent and usually less than 1 percent of the vessel cross-sectional area. The velocity of the liquid entering the bed of granular solids through screen 33 should be less than about 2.0 ft./sec. and preferably less than about 0.7 ft./sec. If the liquid velocity exceeds this limit, severe attrition of the granular solids occurs adjacent to the liquid inlet with resultant cracking and pulverizing of the granular solids. Also, local disturbances which promote channeling of the liquid occur.

It should be noted that the screen and diffuser on the nozzle of this invention do not function as a flow restriction or liquid distributor but only act to keep the granular solids out of the nozzle. Also, by placing a deflecting baffle above the flow restriction in this nozzle it is possible to tolerate a higher exit velocity from the flow restriction than if no baffle were used.

It should also be noted that the nozzle of this invention is readily removed from the apparatus in which it is used, and may be taken apart and cleaned easily and the orifice changed, when desired. If the nozzles were fixed in a partition such as 14 this could not be done. While the nozzle of this invention is preferably used in conjunction with systems employing granular solids of at least 4 mesh, it is possible to use the nozzle in a system employing a more finely divided solid. The operation will, however, be somewhat inferior due to the possibilities of plugging of the nozzle. The nozzle is not limited in application to systems employing countercurrent flow of liquid and solids but may also be used in systems where the flow of liquid and solids is concurrent. The nozzle may also be used in systems employing a fixed bed of granular solids or in countercurrent liquid extraction processes. The nozzle may, of course, take other forms than that described hereinabove.

As an example of a suitable apparatus for this invention, its application to a continuous percolation process will be considered. A 14 ft. 6 in. internal diameter percolator was used. There were 380 nozzles spaced on 8 in. equilateral centers across the horizontal cross-section of this vessel. This amounts to about 1 nozzle for every 64 sq. in. of vessel cross-section. The height of the bed of granular material within the vessel was about 17 ft. The nozzles were assembled from ¼ in. body, threaded-on-both-ends cap and strainer. The strainer consisted of 100 mesh stainless steel screen. The orifice in the orifice plate within the nozzle was 0.086 inch in diameter. The oil feed rate was about 17 bbl./day/sq. ft.

Some of the claims drawn to a liquid solid contacting apparatus in this application are dominated by the broader claims in U. S. patent application Serial No. 237,266, filed July 17, 1951.

This invention should be understood to cover all changes and modifications of the example of the invention herein chosen for purposes of disclosure which do not constitute departures from the spirit and scope of the invention.

I claim:

1. An apparatus for the continuous percolation of liquid hydrocarbon oils through a bed of granular adsorbent which comprises in combination: an enclosed vessel adapted to confine a bed of granular adsorbent, a partition extending transversely across the lower section of said vessel to divide said vessel into a contacting chamber above said partition and a liquid plenum chamber therebelow, a plurality of nipples extending through said partition and removably attached thereto and extending substantially vertically upwardly and terminating within said contacting chamber, an orifice plate with flow throttling orifice therein extending transversely across the upper section of each of said nipples, a conduit having a plurality of spaced apart orifices in its walls extending substantially vertically upwardly from each of said orifice plates and terminating at a level above the upper end of said nipples, said orifices in said conduit having a total cross-sectional area greater than said orifice in said orifice plate, a deflecting baffle at the upper end of each of said conduits, a cylindrical screen of mesh size less than the mesh size of said granular material but large enough to avoid throttling liquid flow placed around said conduit and extending upwardly from the upper end of said nipple to the upper end of said conduit, at least one conduit for the removal of granular adsorbent from the lower section of said contacting chamber, at least one conduit for replenishing the supply of contacting material within said contacting chamber extending into the upper section of said contacting chamber, a conduit for the introduction of liquid hydrocarbon oil into said plenum chamber and a conduit for the removal of liquid hydrocarbon oil from the upper section of said contacting chamber.

2. A nozzle for the introduction of liquid into a vessel containing a bed of granular solids which comprises in combination: a nipple having a lower open inlet end and an upper open outlet end, an orifice plate with a flow-restricting orifice therethrough placed substantially horizontally across the upper section of said nipple, an upright cylindrical conduit of less horizontal cross-sectional area than said nipple extending upwardly centrally from said orifice plate and terminating at a vertical level thereabove and above the outlet end of said nipple, said conduit having a plurality of openings therethrough spaced along the length and around the periphery of said conduit, said openings having a total cross-sectional area greater than the cross-sectional area of said flow-restricting orifice, a deflecting baffle closing off the upper end of said conduit and a cylindrical screen around said conduit extending from said baffle downwardly to said orifice plate, said screen being less in mesh size than said granular solids and offering substantially no restriction to liquid flow therethrough.

3. A nozzle for introducing liquid into a closed chamber containing a bed of granular solids which comprises in combination: a nipple having a lower open inlet end and an upper open outlet end and having a seat around its inner periphery near its upper end for a horizontal orifice plate, an orifice plate having a flow-restricting orifice centrally therethrough resting on said seat so as to lie substantially in a horizontal plane, a cylindrical conduit of less horizontal cross-sectional area than said nipple having a flange attached to its lower end and a plurality of spaced apart openings along its length and around its periphery, said openings having a total cross-sectional area greater than the cross-sectional area of said flow-restricting orifice, the lower end of said conduit resting on said orifice plate, a cap having an opening through its upper end of greater lateral dimensions than said conduit but of less lateral dimensions than said flange fixed about the lower section of said conduit and attached to said nipple so as to hold said conduit and said orifice plate in position, a cylindrical screen around said conduit extending upwardly from said flange to the same vertical level in which the upper end of said conduit terminates, said screen being less in mesh size than said granular solids but offering substantially less restriction to liquid flow therethrough than said orifice, and a screw with head of greater lateral dimensions than the internal lateral dimensions of said conduit screwed into the upper end of said conduit so as to close off said upper end.

4. An apparatus for contacting liquid and granular solids of a palpable particulate form which comprises in combination: a vessel; a partition extending transversely across the lower section of said vessel so as to divide said vessel into a contacting chamber above said partition and a liquid plenum chamber therebelow, said partition having a plurality of equally spaced apart threaded openings therethrough; a plurality of nozzles fitting into said openings, each of said nozzles consisting of a nipple threaded on both ends, one of said ends being capable of being screwed into said openings, an internal shoulder within said nipple, an orifice plate with a flow-restricting orifice therethrough of such a size that it will rest on said shoulder, a hollow baffle support member flanged on its lower end to fit within said nipple and having apertures in its side walls resting on and extending upwardly from said orifice plate to a level above said nipple, said apertures having a total cross-sectional area greater than the cross-sectional area of said orifice, a cap capable of being screwed onto the upper end of said nipple and having an opening through which said baffle support member extends whereby said orifice plate and said baffle supporting member are held in position, a baffle screwed into the upper end of said baffle supporting member so as to close off said upper end, a screen extending around said baffle supporting member and covering said apertures and having mesh openings smaller than said granular solids but offering substantially less resistance to flow of liquid therethrough than said orifice, members defining at least one passageway for supplying contact material to the upper section of said contacting chamber, members defining at least one passageway for removing contact material from the lower section of said chamber, members defining at least one passageway for supplying liquid to said plenum chamber and members defining at least one passageway for removing liquid from the upper section of said contacting chamber.

5. An apparatus for the continuous percolation of liquid through a downwardly moving bed of granular solids, which comprises in combination: an enclosed contacting chamber adapted to confine a bed of granular solids, a liquid plenum chamber beneath said contacting chamber, at least one short nipple for liquid flow extending upwardly from said plenum chamber into the lower section of said contacting chamber and removably attached to a wall of said plenum chamber, an orifice plate with flow restricting orifice therein extending laterally across said nipple, a deflecting baffle fixed centrally a spaced distance above the upper end of said nipple, a screen enclosing the space between said baffle and the upper end of said nipple, said screen being less in mesh size than said contact material, the area for liquid flow between said baffle and the adjacent end of said nipple and the area for liquid flow between said baffle and the wall of said plenum chamber to which said nipple is attached and the total area of the openings in said screen each being greater than the area of said orifice in said orifice plate, means for introducing liquid into said plenum chamber whereby liquid flows from said plenum chamber through said nipple, orifice and screen into said contacting chamber, means for removing liquid from the upper section of said contacting chamber, means for introducing granular solids into the upper section of said contacting chamber and means for removing granular solids from the lower section of said contacting chamber.

6. An apparatus for the continuous percolation of liquid through an upwardly moving bed of granular solids, which comprises in combination: an enclosed vessel, a partition extending transversely across the lower section of said vessel so as to divide said vessel into a liquid charge plenum chamber below said partition, and a contacting chamber above said partition, means for introducing granular solids into the upper section of said contacting chamber, means for removing granular solids from the lower section of said contacting chamber, a plurality of spaced apart nipples extending through said partition and removably attached within the lower section of said contacting chamber, an orifice plate with a flow restricting orifice therein extending transversely across the upper section of each of said nipples, a baffle a spaced distance above the upper end of each of said nipples, a screen enclosing the spaces between each of said nipples and said baffles, said screen being less in mesh size than said granular solids, the area for liquid flow between said baffle and the adjacent end of said nipple and the area for liquid flow between said baffle and said partition and the total area of the openings in said screen each being greater than the area of said flow restricting orifice, means for introducing liquid into said plenum chamber and means for removing liquid from the upper section of said contacting chamber whereby liquid flows from said plenum chamber through said nipples, orifice and screen into the lower section of said contacting chamber and then upwardly through said contacting chamber.

7. A nozzle for the introduction of liquid into a vessel containing granular solid material, which comprises in combination: a body having an open inlet end and an open outlet end, an orifice plate with a flow restricting orifice extending across said body, a conduit of less horizontal cross-section than said nipples extending upwardly from said orifice plate and terminating thereabove, said conduit having a plurality of openings through its side walls which have a total area greater than the area of said flow restricting orifice, a deflecting baffle positioned at the upper end of said conduit, a circumferentially complete screen extending around said conduit, the total openings in said screen being of greater area than the area of said flow restricting orifice.

References Cited in the file of this patent

UNITED STATES PATENTS

| | | |
|---|---|---|
| 401,057 | Perkins | Apr. 9, 1889 |
| 473,011 | Moore | Apr. 19, 1892 |
| 523,585 | Moore | July 24, 1894 |
| 1,566,058 | Williamson | Dec. 15, 1925 |
| 1,703,451 | McGill | Feb. 26, 1929 |
| 2,412,135 | Evans | Dec. 3, 1946 |
| 2,629,632 | Munson | Feb. 24, 1953 |